United States Patent
Chang et al.

(10) Patent No.: US 11,108,431 B2
(45) Date of Patent: Aug. 31, 2021

(54) WIRELESS COMMUNICATION APPARATUS FOR PERFORMING BEAMFORMING UNDER FREQUENCY HOPPING AND ASSOCIATED WIRELESS COMMUNICATION METHOD

(71) Applicant: MEDIATEK INC., Hsin-Chu (TW)

(72) Inventors: Yu-Hsien Chang, Hsin-Chu (TW);
Ching-Chia Cheng, Hsin-Chu (TW);
Shuo-Jen Hsu, Hsin-Chu (TW);
Ying-Che Hung, Hsin-Chu (TW);
Li-Chun Ko, Hsin-Chu (TW)

(73) Assignee: MediaTek Inc., Hsin-Chu (TW)

( * ) Notice: Subject to any disclaimer, the term of this patent is extended or adjusted under 35 U.S.C. 154(b) by 0 days.

(21) Appl. No.: 16/735,714

(22) Filed: Jan. 7, 2020

(65) Prior Publication Data
US 2020/0244304 A1 Jul. 30, 2020

Related U.S. Application Data

(60) Provisional application No. 62/798,587, filed on Jan. 30, 2019.

(51) Int. Cl.
*H04B 1/713* (2011.01)
*H04B 7/06* (2006.01)
(Continued)

(52) U.S. Cl.
CPC .......... *H04B 1/713* (2013.01); *H04B 7/0617* (2013.01); *H04L 5/1469* (2013.01);
(Continued)

(58) Field of Classification Search
CPC .................. H04B 1/713; H04B 7/0617; H04B 2201/71346; H04B 2201/71323; H04L 5/1469; H04L 25/0202; H04W 84/20
See application file for complete search history.

(56) References Cited

U.S. PATENT DOCUMENTS

| | | | |
|---|---|---|---|
| 6,785,513 | B1 | 8/2004 | Sivaprakasam |
| 6,873,651 | B2 | 3/2005 | Tesfai |
| (Continued) | | | |

FOREIGN PATENT DOCUMENTS

| | | |
|---|---|---|
| CN | 103095324 A | 5/2013 |
| CN | 106028408 A | 10/2016 |
| (Continued) | | |

*Primary Examiner* — Vineeta S Panwalkar
(74) *Attorney, Agent, or Firm* — Wolf, Greenfield & Sacks, P.C.

(57) ABSTRACT

A wireless communication apparatus includes a channel estimation circuit, a beamforming control circuit, and a transmit (TX) circuit. The channel estimation circuit estimates a channel between the wireless communication apparatus and another wireless communication apparatus during at least one first time slot. The beamforming control circuit determines beamforming coefficients according to the estimated channel. The TX circuit applies the beamforming coefficients to transmission of an output data during at least one second time slot later than the at least one first time slot. During the at least one second time slot, the output data is transmitted to another wireless communication apparatus via multiple antennae. The wireless communication apparatus performs communications according to a normal frequency hopping sequence in compliance with a communication specification.

6 Claims, 11 Drawing Sheets

(51) Int. Cl.
*H04L 5/14* (2006.01)
*H04W 84/20* (2009.01)

(52) U.S. Cl.
CPC ............ *H04B 2201/71323* (2013.01); *H04B 2201/71346* (2013.01); *H04W 84/20* (2013.01)

(56) References Cited

U.S. PATENT DOCUMENTS

| | | | |
|---|---|---|---|
| 7,050,402 B2 | 5/2006 | Schmidl | |
| 7,573,945 B2 | 8/2009 | Tesfai | |
| 7,634,019 B2 | 12/2009 | Dabak | |
| 7,684,465 B1 | 3/2010 | Dabak | |
| 9,136,902 B2 * | 9/2015 | Chang | H04B 1/7143 |
| 2002/0034263 A1 * | 3/2002 | Schmidl | H04L 1/0001 |
| | | | 375/299 |
| 2002/0145980 A1 * | 10/2002 | Morley | H04W 84/20 |
| | | | 370/244 |
| 2006/0280143 A1 | 12/2006 | Dabak | |
| 2007/0076811 A1 * | 4/2007 | Aldana | H04L 25/0204 |
| | | | 375/267 |
| 2008/0117875 A1 | 5/2008 | Bennett | |
| 2014/0328331 A1 * | 11/2014 | Truong | H04W 4/80 |
| | | | 370/336 |
| 2016/0359661 A1 * | 12/2016 | Chhabra | H04B 7/0413 |
| 2018/0349959 A1 * | 12/2018 | Terazaki | G06Q 30/0269 |
| 2019/0007115 A1 | 1/2019 | Luong | |

FOREIGN PATENT DOCUMENTS

| | | |
|---|---|---|
| CN | 106921421 A | 7/2017 |
| EP | 2 911 356 A1 | 8/2015 |

\* cited by examiner

WIRELESS COMMUNICATION APPARATUS FOR PERFORMING BEAMFORMING UNDER FREQUENCY HOPPING AND ASSOCIATED WIRELESS COMMUNICATION METHOD

CROSS REFERENCE TO RELATED APPLICATIONS

This application claims the benefit of U.S. provisional application No. 62/798,587, filed on Jan. 30, 2019 and incorporated herein by reference.

BACKGROUND

The present invention relates to wireless communication, and more particularly, to a wireless communication apparatus for performing beamforming under frequency hopping and an associated wireless communication method.

The Bluetooth protocol provides a short-range radio link intended to replace cables that connect portable and/or fixed electronic devices, and operates in an unlicensed industrial, scientific and medical (ISM) band at 2.4 GHz. Each master device may have active connections of up to seven slave devices. Such a connection between a master device and one or more slave devices forms a piconet. Specifically, each piconet has only one master device, and slave devices can participate in different piconets. At the start of any connection, an initiating unit is a temporary master device. This temporary assignment, however, may change after initial communications are established.

The Bluetooth protocol uses time-division duplex (TDD) to support bi-directional communication between the master device and the slave device. In addition, spread-spectrum technology or frequency diversity with frequency hopping permits operation in noisy environments and permits multiple piconets to exist in close proximity. The frequency hopping scheme permits up to 1600 hops per second over 79 1-MHz channels. The channels are assigned to time slots, where each time slot is a 625 us (microsecond) in length, and corresponds to one hopping frequency. The channels are represented by a pseudo-random frequency hopping sequence that is determined by a master device in a piconet. The master device starts transmission in even-numbered time slots only, where the transmission may be extended over up to 5 time slots. The slave device starts transmission in odd-numbered time slots only.

A Bluetooth system that consists of a master device and one or more slave devices is a low-power, short-range, wireless communication system. There is a need for an innovative design that is capable of improving the transmission distance as well as the signal-to-noise ratio (SNR).

SUMMARY

One of the objectives of the claimed invention is to provide a wireless communication apparatus for performing beamforming under frequency hopping and an associated wireless communication method.

According to a first aspect of the present invention, an exemplary wireless communication apparatus is disclosed. The exemplary wireless communication apparatus includes a channel estimation circuit, a beamforming control circuit, and a transmit (TX) circuit. The channel estimation circuit is arranged to estimate a channel between the wireless communication apparatus and another wireless communication apparatus during at least one first time slot. The beamforming control circuit is arranged to determine beamforming coefficients according to the estimated channel. The TX circuit is arranged to apply the beamforming coefficients to transmission of an output data during at least one second time slot later than the at least one first time slot. During the at least one second time slot, the output data is transmitted to another wireless communication apparatus via multiple antennae. The wireless communication apparatus performs communications according to a normal frequency hopping sequence in compliance with a communication specification.

According to a second aspect of the present invention, an exemplary wireless communication method is disclosed. The exemplary wireless communication method includes: configuring a first wireless communication apparatus to perform communications according to a normal frequency hopping sequence in compliance with a communication specification; during at least one first time slot, performing channel estimation to estimate a channel between the first wireless communication apparatus and a second communications apparatus; determining beamforming coefficients according to the estimated channel; and during at least one second time slot later than the at least one first time slot, applying the beamforming coefficients to transmission of an output data for transmitting the output data from the first communications apparatus to the second communications apparatus via multiple antennae.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
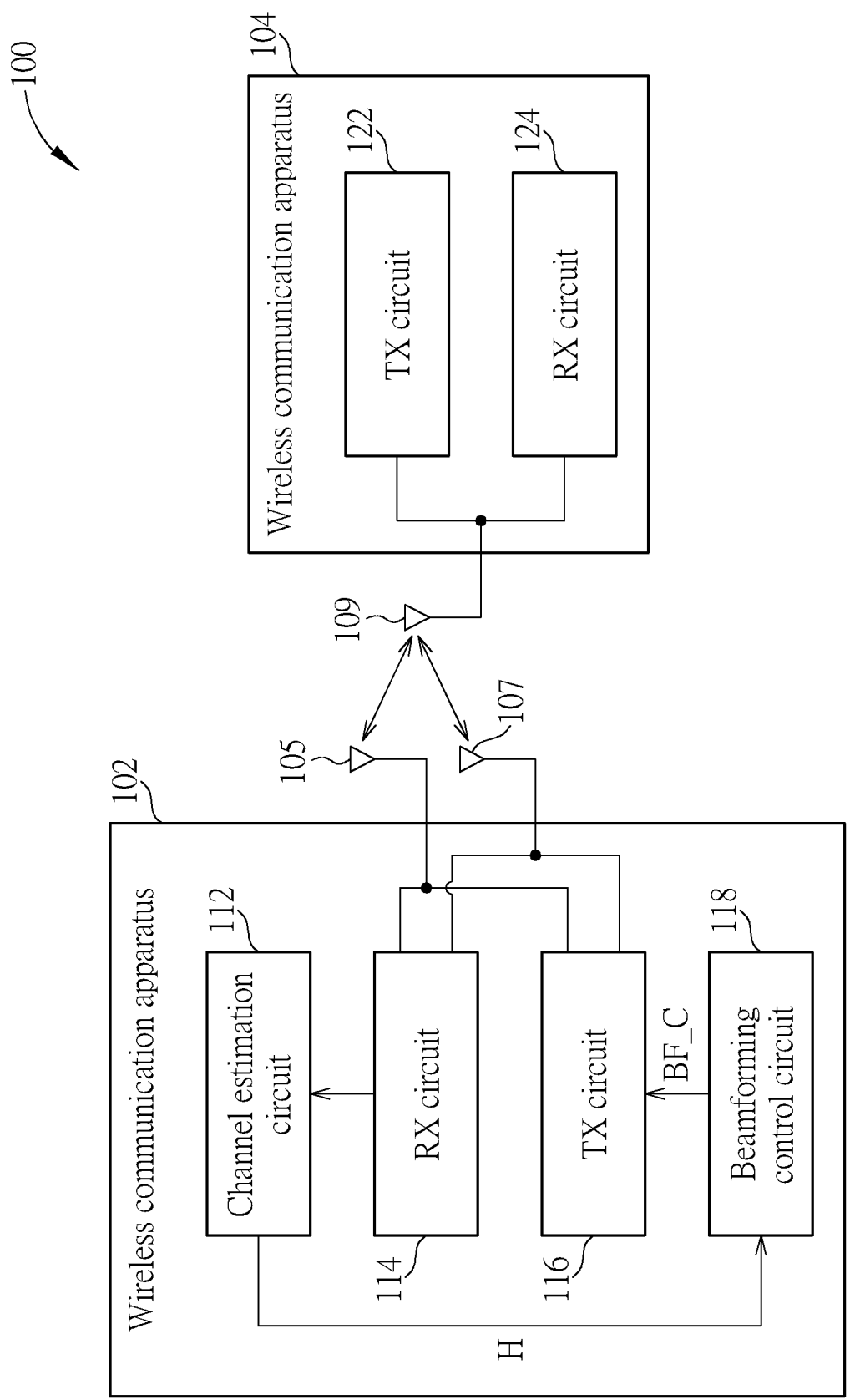
FIG. 1 is a diagram illustrating a first wireless communication system according to an embodiment of the present invention.

FIG. 1 is a diagram illustrating a first wireless communication system according to an embodiment of the present invention. The wireless communication system 100 includes a plurality of wireless communication apparatuses 102 and 104, where one of the wireless communication apparatuses 102 and 104 may act as a master device, and the other of the wireless communication apparatuses 102 and 104 may act as a slave device. For clarity and simplicity, only two wireless communication apparatuses are illustrated. In practice, the wireless communication system 100 may include more than two wireless communication apparatuses, where one of the wireless communication apparatuses may act as a master device, and the rest of the wireless communication apparatuses may act as slave devices. In the following, it is assumed that the wireless communication apparatus 102 communicates with the wireless communication apparatus 104 according to a Bluetooth (BT) specification. For example, the wireless communication apparatus 102 may act as a BT slave device, and the wireless communication apparatus 104 may act as a BT master device. However, this is not meant to be a limitation of the present invention. Any wireless communication apparatus using a proposed scheme that jointly employs beamforming and frequency hopping falls within the scope of the present invention.

The wireless communication apparatus 102 includes multiple antennae 105 and 107, a channel estimation circuit 112, a receive (RX) circuit 114, a transmit (TX) circuit 116, and a beamforming control circuit 118. The wireless communication apparatus 104 includes a single antenna 109, a TX circuit 122, and an RX circuit 124. In this embodiment, since the wireless communication apparatus 102 has more than one antenna, the TX circuit 116 of the wireless communication apparatus 102 supports an implicit beamforming (iBF) function. However, since the wireless communication apparatus 104 has only a single antenna, the iBF function for signal transmission is not supported by the wireless communication apparatus 104. Hence, the wireless communication apparatus 102 may act as a beamformer, and the wireless communication apparatus 104 may act as a beamformee. It should be noted that, since the wireless communication apparatus 102 has more than one antenna, the RX circuit 114 of the wireless communication apparatus 102 may support a maximum-ratio combining (MRC) function for achieving an improved signal-to-noise ratio (SNR).

The wireless communication apparatus 104 may transmit a packet from the TX circuit 122, and the wireless communication apparatus 102 may receive the packet from the RX circuit 114. In accordance with the BT specification, an access code (ACC) is included in each packet for synchronization, identification, etc. In this embodiment, the access code received at the RX circuit 114 can be used for channel estimation. The channel between antenna 109 of the wireless communication apparatus 104 and antennae 105, 107 of the wireless communication apparatus 102 may be modeled by a channel matrix $$H_{2 \times 1} = \begin{bmatrix} h_{11} \\ h_{21} \end{bmatrix}.$$

The access code Rx0 actually received at the RX circuit 114 (particularly, one receiver of the RX circuit 114) via the antenna 105 and the access code Rx1 actually received at the RX circuit 114 (particularly, another receiver of the RX circuit 114) via the antenna 107 may be expressed using the following formula.

$$\begin{bmatrix} Rx0 \\ Rx1 \end{bmatrix} = \begin{bmatrix} h_{11} \\ h_{21} \end{bmatrix} ACC = \begin{bmatrix} h_{11} ACC \\ h_{21} ACC \end{bmatrix} \quad (1)$$

Since the access code (ACC) transmitted from the TX circuit 122 of the wireless communication apparatus 104 is known and the access codes Rx0, Rx1 are obtained at the RX circuit 114 of the wireless communication apparatus 102, the channel matrix $H_{2 \times 1}$ can be obtained by the channel estimation circuit 112 through using the following formula.

$$H_{2 \times 1} = \begin{bmatrix} h_{11} \\ h_{21} \end{bmatrix} = \begin{bmatrix} \frac{Rx0}{ACC} \\ \frac{Rx1}{ACC} \end{bmatrix} \quad (2)$$

The implicit beamforming assumes that the down-link environment is the same as the up-link environment. The down-link channel $H_{2 \times 1}$ calculated by formula (2) can be used to determine beamforming coefficients used for up-link transmission from the wireless communication apparatus 102 to the wireless communication apparatus 104. With proper settings of the beamforming coefficients at the wireless communication apparatus 102, the wireless communication apparatus 104 can receive the maximum signal power.

Regarding the wireless communication apparatus 102, the channel estimation circuit 112 is arranged to estimate a channel H (e.g., down-link channel $H_{2 \times 1}$) between the wireless communication apparatuses 102 and 104 during at least one first time slot. For example, an access code included in a BT packet transmitted from the wireless communication apparatus 102 to the wireless communication apparatus 104 may be used for channel estimation. The beamforming control circuit 118 is arranged to determine beamforming coefficients BF_C according to the estimated channel H. The TX circuit 116 is arranged to apply the beamforming coefficients BF_C to transmission of an output data during at least one second time slot later than the at least one first time slot. During the at least one second time slot, the output data is transmitted to the wireless communication apparatus 104 via multiple antennae 105 and 107. It should be noted that the wireless communication apparatus 102 performs communications according to a normal frequency hopping sequence in compliance with a communication specification.

In this embodiment, the communication specification is the BT specification. Hence, the wireless communication system 100 is a BT system that operates in a time-division duplex (TDD) manner. Since the beamformee does not support beamforming for signal transmission and needs to transmit a packet (which includes an access code) in at least one first time slot that is earlier than at least one second time slot in which the beamformer performs beamforming for signal transmission, the wireless communication system 102 is further arranged to strive to act as a slave device by sending a master-slave role switch request to the wireless communication apparatus 104. In accordance with the BT specification, the link management protocol (LMP) handles configuration and control of the BT baseband links. Hence, switch of master-slave role can be achieved by LMP mechanism. Supposing that the wireless communication system 102 is a master device and the wireless communication system 104 is a slave device after initial communications are established, a master initiated master-slave role switch procedure takes places, and afterwards the wireless communication system 102 becomes a salve device and the wireless communication system 104 becomes a master device. Hence, the output data is transmitted to the wireless communication apparatus 104 being a master device by the wireless communication apparatus 102 being the slave device that performs signal transmission with beamforming.

Frequency hopping spread spectrum (FHSS) is used by the BT specification. The basic idea is that, the channel frequency which is shared by each member of a piconet is periodically changed. The frequency of a BT radio link is changed by frequency hops between channels in the unlicensed ISM band at 2.4 GHz. The hopping process is performed in a pseudo-random manner in order to reduce interference effects. Adaptive frequency hopping (AFH) is available for BT connection state. The term "adaptive" is used to indicate that, during the hopping process, the channel conditions are permanently monitored to identify occupied or low quality channels which are termed "bad channels". The bad channels are excluded from the available channels within the hopping sequence until they become good channels again. The master device and all slave devices within a piconet can operate under AFH for monitoring channel conditions and avoiding bad channels. In this embodiment, the wireless communication system 102 being a salve device and the wireless communication system 104 being a master device are both arranged to operate under AFH. In this way, the operating channel of last up-link between the master device and the slave device is the same as the operating channel of last down-link between the master device and the same slave device.

For better understanding of technical features of a wireless communication system having at least one wireless communication apparatus that supports both of beamforming and frequency hopping and at least one wireless communication apparatus that supports frequency hopping but not beamforming, an exemplary TDD scheme for packet transmission is described as below.

Figure 2:
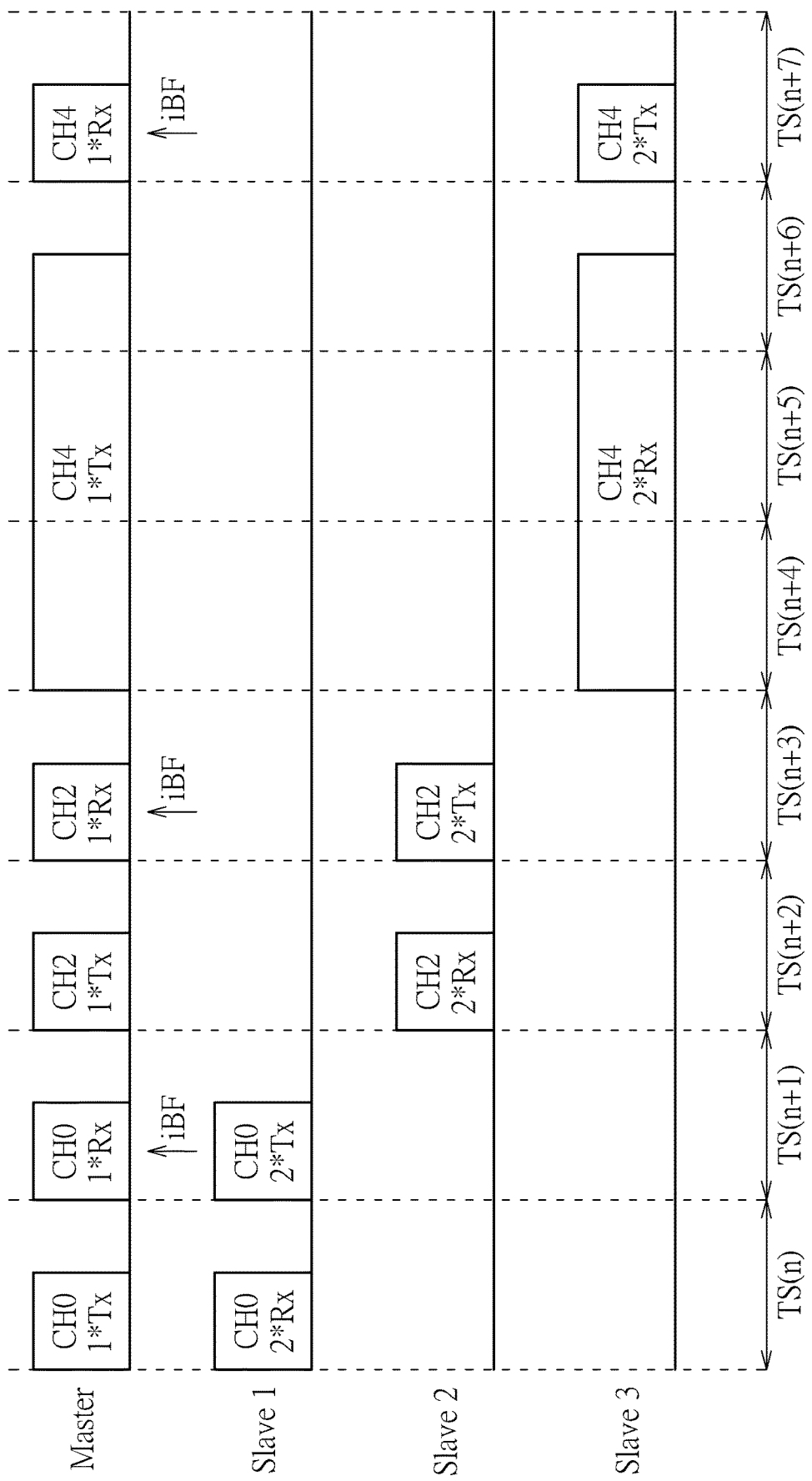
FIG. 2 is a diagram illustrating a first time-division duplex (TDD) scheme for packet transmission according to an embodiment of the present invention.

FIG. 2 is a diagram illustrating a first TDD scheme for packet transmission according to an embodiment of the present invention. Suppose that the wireless communication system 100 shown in FIG. 1 is configured to have one wireless communication apparatus 104 that acts as a BT master device (denoted by "Mater") within a piconet and three wireless communication apparatuses 102 that act as BT slave devices (denoted by "Slave 1", "Slave 2", and "Slave 3") within the piconet. In accordance with the BT specification, a master device starts transmission in even-numbered time slots, where transmission may be extended over up to 5 time slots; and a slave device starts transmission in odd-numbered time slots. In addition, hopping frequency should remain fixed for the duration of one packet. As shown in FIG. 2, there are consecutive time slots TS(n)-TS(n+7) each having a length of 625 us, where time slots TS(n), TS(n+2), TS(n+4), and TS(n+6) are even-numbered time slots, and TS(n+1), TS(n+3), TS(n+5), and TS(n+7) are odd-numbered time slots.

During the time slot TS(n), the BT master device "Master" transmits a packet at channel CH0 by using a single antenna, and the BT slave device "Slave 1" receives the same packet at channel CH0 by using two antennae. The BT slave device "Slave 1" performs channel estimate according to received packets (particularly, two received access codes obtained via different antennae), and determines beamforming coefficients according to the estimated channel CH0. During the time slot TS (n+1), the BT slave device "Slave 1" transmits a packet at channel CH0 by using two antennae, where beamforming coefficients (which are determined for the channel CH0) are applied to packet transmission in the time slot TS(n+1); and the BT master device "Master" receives the packet at channel CH0 by using a single antenna. Specifically, the BT slave device "Slave 1" performs implicit beamforming (iBF) based on the channel estimation of the last down-link channel. Since the BT master device "Master" and the BT slave devices "Slave 1", "Slave 2", and "Slave 3" operate under AFH, the down-link channel used by the BT master device "Master" and the BT slave device "Slave 1" in the time slot TS(n) is the same as the up-link channel used by the BT master device "Master" and the BT slave device "Slave 1" in the time slot TS(n+1).

During the time slots TS(n+2), the BT master device "Master" transmits a packet at channel CH2 by using a single antenna, and the BT slave device "Slave 2" receives the same packet at channel CH2 by using two antennae, where a channel frequency of the channel CH2 is different from a channel frequency of the channel CH0. The BT slave device "Slave 2" performs channel estimate according to received packets (particularly, two received access codes obtained via different antennae), and determines beamforming coefficients according to the estimated channel CH2. During the time slot TS(n+3), the BT slave device "Slave 2" transmits a packet at channel CH2 by using two antennae, where beamforming coefficients (which are determined for the channel CH2) are applied to packet transmission in the time slot TS(n+3); and the BT master device "Master" receives the packet at channel CH2 by using a single antenna. Specifically, the BT slave device "Slave 2" performs iBF based on the channel estimation of the last down-link channel. Since the BT master device "Master" and the BT slave devices "Slave 1", "Slave 2", and "Slave 3" all operate under AFH, the down-link channel used by the BT master device "Master" and the BT slave device "Slave 2" in the time slot TS(n+2) is the same as the up-link channel used by the BT master device "Master" and the BT slave device "Slave 2" in the time slot TS(n+3).

During the time slots TS(n+4)-TS(n+6), the BT master device "Master" transmits a packet at channel CH4 by using a single antenna, and the BT slave device "Slave 3" receives the same packet at channel CH4 by using two antennae, where a channel frequency of the channel CH4 is different from a channel frequency of the channel CH2. The BT slave device "Slave 3" performs channel estimate according to received packets (particularly, two received access codes obtained via different antennae), and determines beamforming coefficients according to the estimated channel CH4. During the time slot TS (n+7), the BT slave device "Slave 3" transmits a packet at channel CH4 by using two antennae, where beamforming coefficients (which are determined for the channel CH4) are applied to packet transmission in the time slot TS(n+7); and the BT master device "Master" receives the packet at channel CH4 by using a single antenna. Specifically, the BT slave device "Slave 3" performs iBF based on the channel estimation of the last down-link channel. Since the BT master device "Master" and the BT slave devices "Slave 1", "Slave 2", and "Slave 3" all operate under AFH, the down-link channel used by the BT master device "Master" and the BT slave device "Slave 3" in the time slots TS(n+4)-TS(n+6) is the same as the up-link channel used by the BT master device "Master" and the BT slave device "Slave 3" in the time slot TS(n+7).

Figure 3:
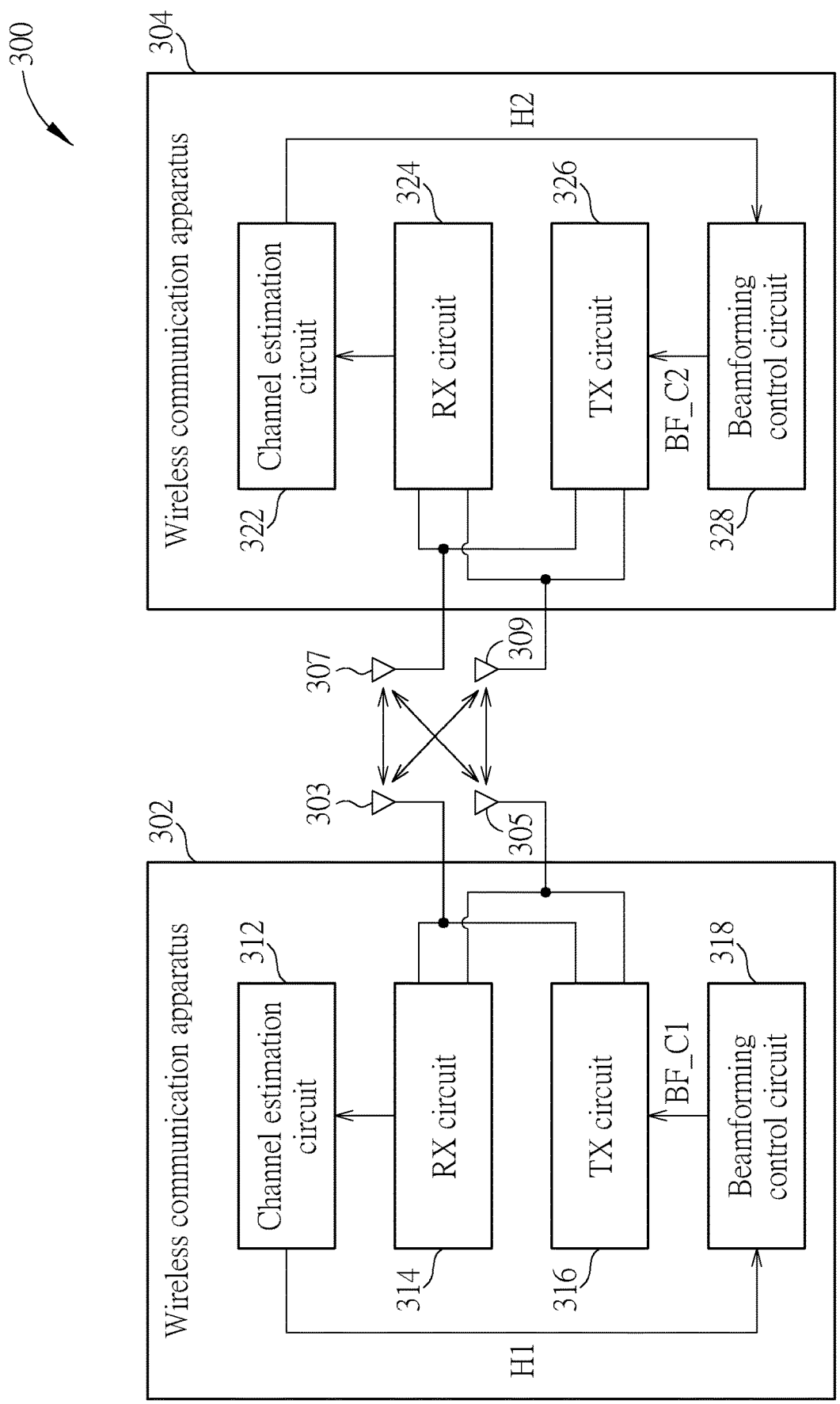
FIG. 3 is a diagram illustrating a second wireless communication system according to an embodiment of the present invention.

FIG. 3 is a diagram illustrating a second wireless communication system according to an embodiment of the present invention. The wireless communication system 300 includes a plurality of wireless communication apparatuses 302 and 304, where one of the wireless communication apparatuses 302 and 304 may act as a master device, and the other of the wireless communication apparatuses 302 and 304 may act as a slave device. For clarity and simplicity, only two wireless communication apparatuses are illustrated. In practice, the wireless communication system 300 may include more than two wireless communication apparatuses, where one of the wireless communication apparatuses may act as a master device, and the rest of the wireless communication apparatuses may act as slave devices. In the following, it is assumed that the wireless communication apparatus 302 communicates with the wireless communication apparatus 304 according to a Bluetooth (BT) specification. For example, the wireless communication apparatuses 302 and 304 may include one BT master device and one BT slave device. However, this is not meant to be a limitation of the present invention. Any wireless communication apparatus using a proposed scheme that jointly employs beamforming and frequency hopping falls within the scope of the present invention.

Regarding the wireless communication apparatus 302, it includes multiple antennae 303 and 305, a channel estimation circuit 312, a receive (RX) circuit 314, a transmit (TX) circuit 316, and a beamforming control circuit 318. Regarding the wireless communication apparatus 304, it includes multiple antennae 307 and 309, a channel estimation circuit 322, an RX circuit 324, a TX circuit 326, and a beamforming control circuit 328. In this embodiment, since each of the wireless communication apparatuses 302 and 304 has more than one antenna, the TX circuit 316 of the wireless communication apparatus 302 and the TX circuit 326 of the wireless communication apparatus 304 both support an implicit beamforming (iBF) function. In a case where the wireless communication apparatus 302 acts as a beamformer, the wireless communication apparatus 304 acts as a beamformee. In another case where the wireless communication apparatus 304 acts as a beamformer, the wireless communication apparatus 302 acts as a beamformee. It should be noted that, since each of the wireless communication apparatuses 302 and 304 has more than one antenna, the RX circuit 314 of the wireless communication apparatus 302 and the RX circuit 324 of the wireless communication apparatus 304 may both support an MRC function for achieving an improved SNR.

Figure 4:
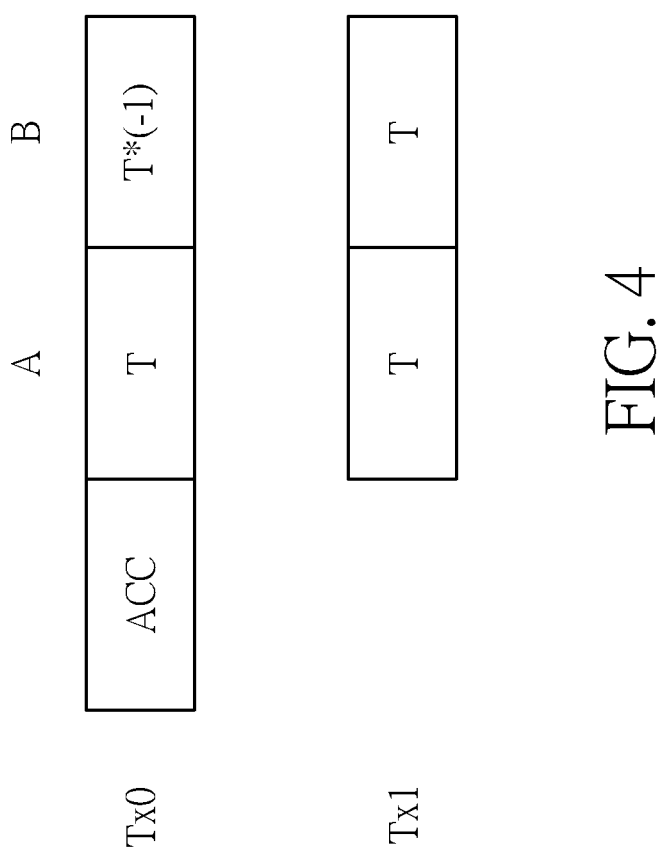
FIG. 4 is a diagram illustrating training signal transmission for channel estimation according to an embodiment of the present invention.

One of the wireless communication apparatuses 302 and 304 may transmit a packet from its TX circuit, and the other of the wireless communication apparatuses 302 and 304 may receive the packet from its RX circuit. In accordance with the BT specification, an access code (ACC) is included in each packet for synchronization, identification, etc. Since each of the wireless communication apparatuses 302 and 304 has more than one antenna for signal transmitting/receiving, the access code is not sufficient for estimating the channel between the wireless communication apparatuses 302 and 304. In this embodiment, a training sequence consisting of training signals (e.g., known symbols) are transmitted for channel estimation. FIG. 4 is a diagram illustrating training signal transmission for channel estimation according to an embodiment of the present invention. Suppose that training signal transmission is initiated by the wireless communication apparatus 304. A training signal A consists of a symbol T that is transmitted from the TX circuit 326 (particularly, one transmitter) via the antenna 307 and the same symbol T that is transmitted from the TX circuit 326 (particularly, another transmitter) via the antenna 309. The channel between antennae 303, 305 of the wireless communication apparatus 302 and antennae 307, 309 of the wireless communication apparatus 304 may be modeled by a channel matrix $$H_{2\times 2} = \begin{bmatrix} h_{11} & h_{01} \\ h_{10} & h_{11} \end{bmatrix}.$$

The training signal $R_{0A}$ actually received at the RX circuit 314 (particularly, one receiver) via the antenna 303 and the training signal $R_{1A}$ actually received at the RX circuit 314 (particularly, another receiver) via the antenna 305 may be expressed using the following formula.

$$\begin{bmatrix} R_{0A} \\ R_{1A} \end{bmatrix} = \begin{bmatrix} h_{00} & h_{01} \\ h_{10} & h_{11} \end{bmatrix} \begin{bmatrix} T \\ T \end{bmatrix} \quad (3)$$

Another training signal B is transmitted after transmission of the training signal B is done. The training signal B consists of a symbol T*(−1) that is transmitted from the TX circuit 326 (particularly, one transmitter) via the antenna 307 and the symbol T that is transmitted from the TX circuit 326 (particularly, another transmitter) via the antenna 309. The training signal $R_{0B}$ actually received at the RX circuit 314 (particularly, one receiver) via the antenna 303 and the training signal $R_{1B}$ actually received at the RX circuit 314 (particularly, another receiver) via the antenna 305 may be expressed using the following formula.

$$\begin{bmatrix} R_{0B} \\ R_{1B} \end{bmatrix} = \begin{bmatrix} h_{00} & h_{01} \\ h_{10} & h_{11} \end{bmatrix} \begin{bmatrix} T*(-1) \\ T \end{bmatrix} \quad (4)$$

Since the training signals A and B transmitted from the TX circuit 326 of the wireless communication apparatus 304 are known and the training signals $R_{0A}$, $R_{1A}$, $R_{0B}$, $R_{1B}$ are obtained at the RX circuit 314 of the wireless communication apparatus 302 (formulae (3) and (4)), the channel matrix $H_{2\times 2}$ can be obtained by the channel estimation circuit 112 through using the following formula.

$$H_{2\times 2} = \begin{bmatrix} h_{00} & h_{01} \\ h_{10} & h_{11} \end{bmatrix} = \frac{1}{2}\begin{bmatrix} R_{0A} - R_{0B} & R_{0A} + R_{0B} \\ R_{1A} - R_{1B} & R_{1A} + R_{1B} \end{bmatrix} \quad (5)$$

The implicit beamforming assumes that the down-link environment is the same as the up-link environment. The down-link channel $H_{2\times 2}$ calculated by formula (5) can be used to determine beamforming coefficients used for up-link transmission from the wireless communication apparatus 302 to the wireless communication apparatus 304. Alternatively, the same channel estimation technique can be employed to calculate an up-link channel according to a training sequence transmitted from the wireless communication apparatus 302 (which acts as a slave device) to the wireless communication apparatus 304 (which acts as a master device). Hence, the up-link channel calculated by formula (5) can be used to determine beamforming coefficients used for down-link transmission from the wireless communication apparatus 304 to the wireless communication apparatus 302. With proper settings of the beamforming coefficients at the wireless communication apparatus 302 (or 304), the wireless communication apparatus 304 (or 302) can receive the maximum signal power.

Regarding the wireless communication apparatus 302, the channel estimation circuit 312 is arranged to estimate a channel H1 (e.g., up-link/down-link channel $H_{2\times2}$) between the wireless communication apparatuses 302 and 304 during at least one time slot. The beamforming control circuit 318 is arranged to determine beamforming coefficients BF_C1 according to the estimated channel H1. The TX circuit 316 is arranged to apply the beamforming coefficients BF_C1 to transmission of an output data during at least one second time slot later than the at least one first time slot. During the at least one second time slot, the output data is transmitted to the wireless communication apparatus 304 via multiple antennae 303 and 305. It should be noted that the wireless communication apparatus 302 performs communications according to a normal frequency hopping sequence in compliance with a communication specification (e.g., BT specification).

Regarding the wireless communication apparatus 304, the channel estimation circuit 322 is arranged to estimate a channel H2 (e.g., up-link/down-link channel $H_{2\times2}$) between the wireless communication apparatuses 302 and 304 during the at least one second time slot (or at least one third time slot later than the at least one second time slot). The beamforming control circuit 328 is arranged to determine beamforming coefficients BF_C2 according to the estimated channel H2. The TX circuit 326 is arranged to apply the beamforming coefficients BF_C2 to transmission of an output data during the at least one third time slot (or at least one fourth time slot later than the at least one third time slot). During the at least one third time slot (or the at least one fourth time slot), the output data is transmitted to the wireless communication apparatus 302 via multiple antennae 307 and 309. It should be noted that the wireless communication apparatus 304 performs communications according to a normal frequency hopping sequence in compliance with a communication specification (e.g., BT specification).

For better understanding of technical features of a wireless communication system having wireless communication apparatuses each supporting both of beamforming and frequency hopping, several exemplary TDD schemes for packet transmission are described as below.

Figure 5:
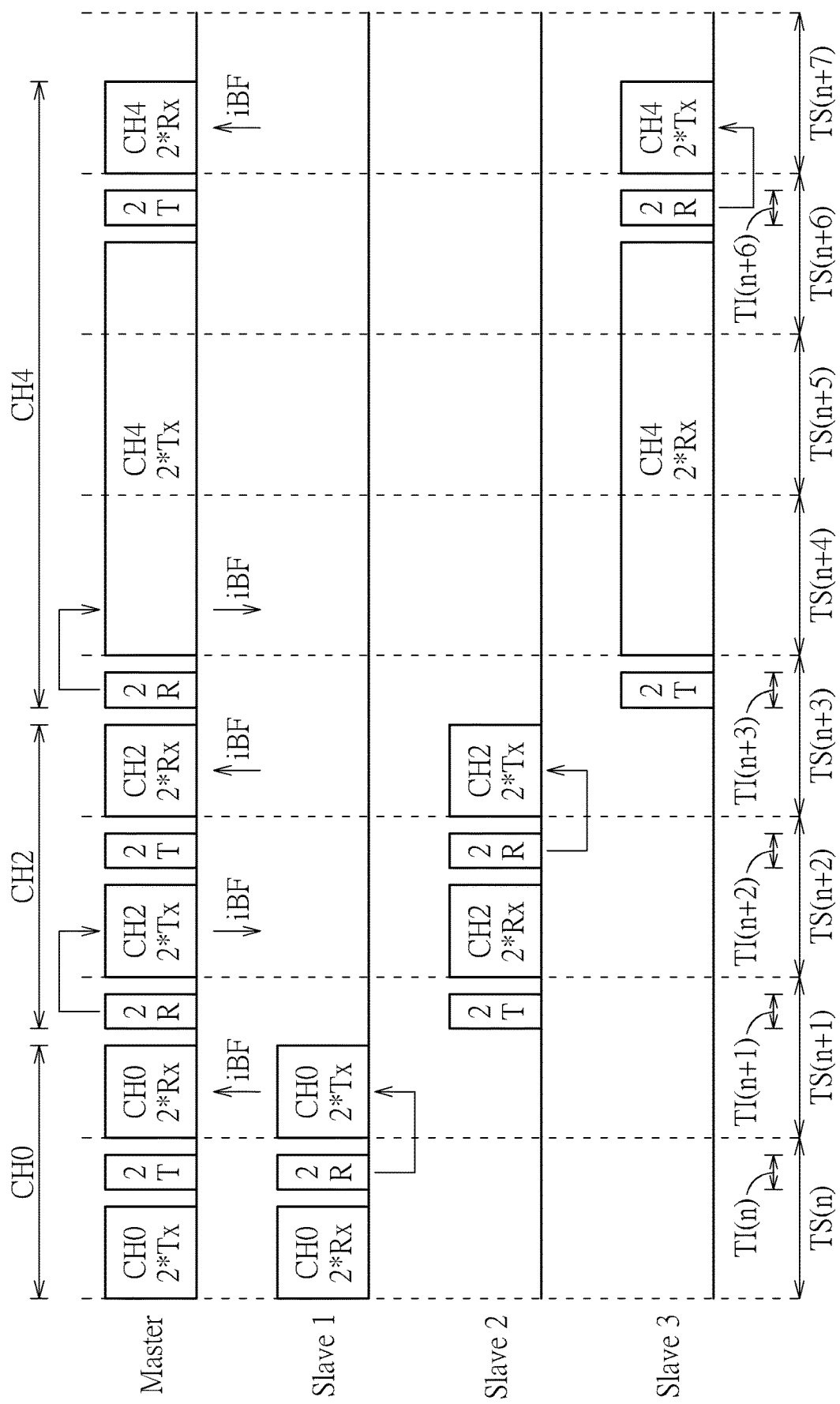
FIG. 5 is a diagram illustrating a second TDD scheme for packet transmission according to an embodiment of the present invention.

FIG. 5 is a diagram illustrating a second TDD scheme for packet transmission according to an embodiment of the present invention. Suppose that the wireless communication system 300 shown in FIG. 3 is configured to have one wireless communication apparatus 302 that acts as a BT master device (denoted by "Mater") within a piconet and three wireless communication apparatuses 304 that act as BT slave devices (denoted by "Slave 1", "Slave 2", and "Slave 3") within the piconet. In accordance with the BT specification, a master device starts transmission in even-numbered time slots, where transmission may be extended over up to 5 time slots; and a slave device starts transmission in odd-numbered time slots. In addition, hopping frequency should remain fixed for the duration of one packet. As shown in FIG. 5, there are consecutive time slots TS (n)-TS (n+7) each having a length of 625 us, where time slots TS(n), TS(n+2), TS(n+4), and TS(n+6) are even-numbered time slots, and TS(n+1), TS(n+3), TS(n+5), and TS(n+7) are odd-numbered time slots. In this embodiment, the BT master device "Master" and the BT slave devices "Slave 1", "Slave 2", "Slave 3" all operate with AFH.

During the time slot TS(n), the BT master device "Master" transmits a packet at channel CH0 by using two antennae, and the BT slave device "Slave 1" receives the same packet at channel CH0 by using two antennae. Since the BT master device "Master" and the BT slave devices "Slave 1", "Slave 2", and "Slave 3" all operate under AFH, the down-link channel used by the BT master device "Master" and the BT slave device "Slave 1" in the time slot TS(n) is the same as the up-link channel used by the BT master device "Master" and the BT slave device "Slave 1" in the time slot TS(n+1). In a margin time interval TI (n) within the time slot TS (n), the BT master device "Master" transmits training signals (which form a 2×2 training signal for channel estimation) at channel CH0 by using two antennae, and the BT slave device "Slave 1" receives the training signals at channel CH0 by using two antennae. The BT slave device "Slave 1" performs channel estimate according to received training signals, and determines beamforming coefficients according to the estimated channel CH0.

During the time slot TS(n+1), the BT slave device "Slave 1" transmits a packet at channel CH0 by using two antennae, where beamforming coefficients (which are determined for the channel CH0) are applied to packet transmission in the time slot TS(n+1); and the BT master device "Master" receives the packet at channel CH0 by using two antennae. Specifically, the BT slave device "Slave 1" performs implicit beamforming (iBF) based on the channel estimation of the last down-link channel. In a margin time interval TI(n+1) within the time slot TS(n+1), the BT slave device "Slave 1" transmits training signals (which form a 2×2 training signal for channel estimation) at channel CH2 (which is different from channel CH0) by using two antennae, and the BT master device "Master" receives the training signals at channel CH2 by using two antennae. The BT master device "Master" performs channel estimation according to received training signals, and determines beamforming coefficients according to the estimated channel CH2.

During the time slot TS(n+2), the BT master device "Master" transmits a packet at channel CH2 by using two antennae, where beamforming coefficients (which are determined for the channel CH2) are applied to packet transmission in the time slot TS(n+2); and the BT slave device "Slave 2" receives the packet at channel CH2 by using two antennae. Specifically, the BT master device "Master" performs iBF based on the channel estimation of the last up-link channel. Since the BT master device "Master" and the BT slave devices "Slave 1", "Slave 2", and "Slave 3" all operate under AFH, the down-link channel used by the BT master device "Master" and the BT slave device "Slave 2" in the time slot TS(n+2) is the same as the up-link channel used by the BT master device "Master" and the BT slave device "Slave 2" in the time slot TS(n+3). In a margin time interval TI(n+2) within the time slot TS(n+2), the BT master device "Master" transmits training signals (which form a 2×2 training signal for channel estimation) at channel CH2 by using two antennae, and the BT slave device "Slave 2" receives the training signals at channel CH2 by using two antennae. The BT slave device "Slave 2" performs channel estimation according to received training signals, and determines beamforming coefficients according to the estimated channel CH2.

Similarly, training signals are transmitted in each of the margin time intervals TI(n+3) and TI(n+6) for channel estimation of the channel CH4. In addition, implicit beamforming is employed for packet transmission in time slots TS(n+3)-TS(n+7). Since a person skilled in the art can readily understand details of following packet transmission by analogy, further description is omitted here for brevity.

In some embodiments of the present invention, an operation mode of each of the BT slave devices "Slave 1", "Slave 2", "Slave 3" shown in FIG. 5 is a sniff mode. In some embodiments of the present invention, an operation mode of each of the BT slave devices "Slave 1", "Slave 2", "Slave 3" shown in FIG. 5 is a slot availability mask (SAM) mode. In either of the sniff mode and the SAM mode, the BT slave device knows which time slot needs to receive a packet from the BT master device.

Figure 6:
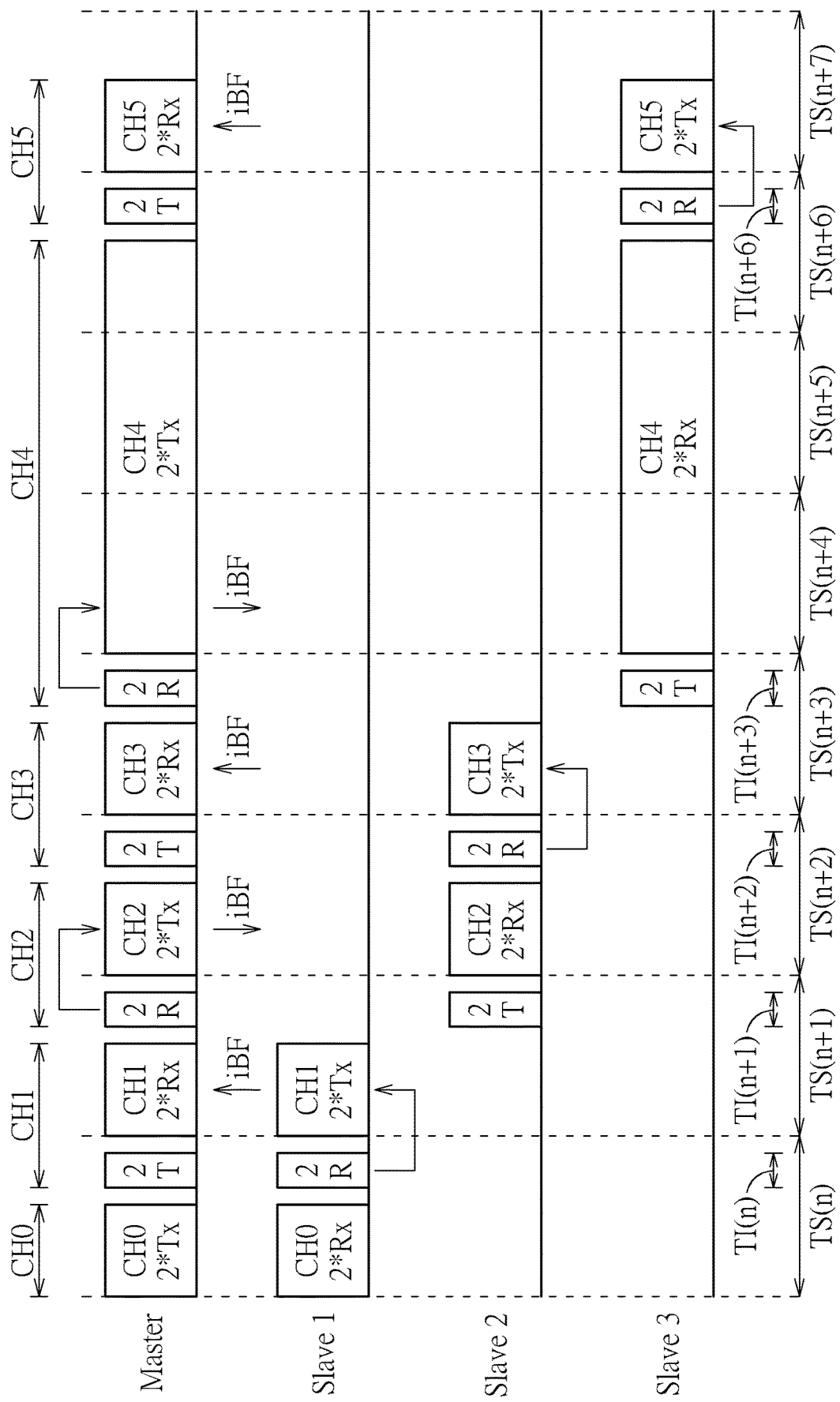
FIG. 6 is a diagram illustrating a third TDD scheme for packet transmission according to an embodiment of the present invention.

FIG. 6 is a diagram illustrating a third TDD scheme for packet transmission according to an embodiment of the present invention. Suppose that the wireless communication system 300 shown in FIG. 3 is configured to have one wireless communication apparatus 302 that acts as a BT master device (denoted by "Mater") within a piconet and three wireless communication apparatuses 304 that act as BT slave devices (denoted by "Slave 1", "Slave 2", and "Slave 3") within the piconet. In accordance with the BT specification, a master device starts transmission in even-numbered time slots, where transmission may be extended over up to 5 time slots; and a slave device starts transmission in odd-numbered time slots. In addition, hopping frequency should remain fixed for the duration of one packet. As shown in FIG. 6, there are consecutive time slots TS(n)-TS(n+7) each having a length of 625 us, where time slots TS(n), TS(n+2), TS(n+4), and TS(n+6) are even-numbered time slots, and TS(n+1), TS(n+3), TS(n+5), and TS(n+7) are odd-numbered time slots. In this embodiment, the BT master device "Master" and the BT slave devices "Slave 1", "Slave 2", "Slave 3" operate with non-adaptive frequency hopping.

During the time slot TS(n), the BT master device "Master" transmits a packet at channel CH0 by using two antennae, and the BT slave device "Slave 1" receives the same packet at channel CH0 by using two antennae. Since the BT master device "Master" and the BT slave devices "Slave 1", "Slave 2", and "Slave 3" all operate under non-adaptive frequency hopping, the down-link channel used by the BT master device "Master" and the BT slave device "Slave 1" in the time slot TS(n) is different from the up-link channel used by the BT master device "Master" and the BT slave device "Slave 1" in the time slot TS(n+). In a margin time interval TI(n) within the time slot TS (n), the BT master device "Master" transmits training signals (which form a 2×2 training signal for channel estimation) at channel CH1 (which is different from channel CH0) by using two antennae, and the BT slave device "Slave 1" receives the training signals at channel CH1 by using two antennae. The BT slave device "Slave 1" performs channel estimation according to received training signals, and determines beamforming coefficients according to the estimated channel CH1.

During the time slot TS(n+1), the BT slave device "Slave 1" transmits a packet at channel CH1 by using two antennae, where beamforming coefficients (which are determined for the channel CH1) are applied to packet transmission in the time slot TS(n+1); and the BT master device "Master" receives the packet at channel CH1 by using two antennae. Specifically, the BT slave device "Slave 1" performs implicit beamforming (iBF) based on the channel estimation of the last down-link channel. In a margin time interval TI(n+1) within the time slot TS(n+1), the BT slave device "Slave 1" transmits training signals (which form a 2×2 training signal for channel estimation) at channel CH2 (which is different from channel CH1) by using two antennae, and the BT master device "Master" receives the training signals at channel CH2 by using two antennae. The BT master device "Master" performs channel estimation according to received training signals, and determines beamforming coefficients according to the estimated channel CH2.

During the time slot TS(n+2), the BT master device "Master" transmits a packet at channel CH2 by using two antennae, where beamforming coefficients (which are determined for the channel CH2) are applied to packet transmission in the time slot TS(n+2); and the BT slave device "Slave 2" receives the packet at channel CH2 by using two antennae. Specifically, the BT master device "Master" performs iBF based on the channel estimation of the last up-link channel. Since the BT master device "Master" and the BT slave devices "Slave 1", "Slave 2", and "Slave 3" operate under non-adaptive frequency hopping, the down-link channel used by the BT master device "Master" and the BT slave device "Slave 2" in the time slot TS(n+2) is different from the up-link channel used by the BT master device "Master" and the BT slave device "Slave 2" in the time slot TS(n+3). In a margin time interval TI(n+2) within the time slot TS (n+2), the BT master device "Master" transmits training signals (which form a 2×2 training signal for channel estimation) at channel CH3 by using two antennae, and the BT slave device "Slave 2" receives the training signals at channel CH3 by using two antennae.

Similarly, training signals are transmitted in each of the margin time intervals TI(n+3) and TI(n+6) for channel estimation of the channels CH4 and CH5. In addition, implicit beamforming is employed for packet transmission in time slots TS(n+3)-TS(n+7). Since a person skilled in the art can readily understand details of following packet transmission by analogy, further description is omitted here for brevity. The time interval between iBF estimation and compensation is short no matter how many slave devices are included in a piconet. Hence, the proposed beamforming design can resist time-varying channels.

Figure 7:
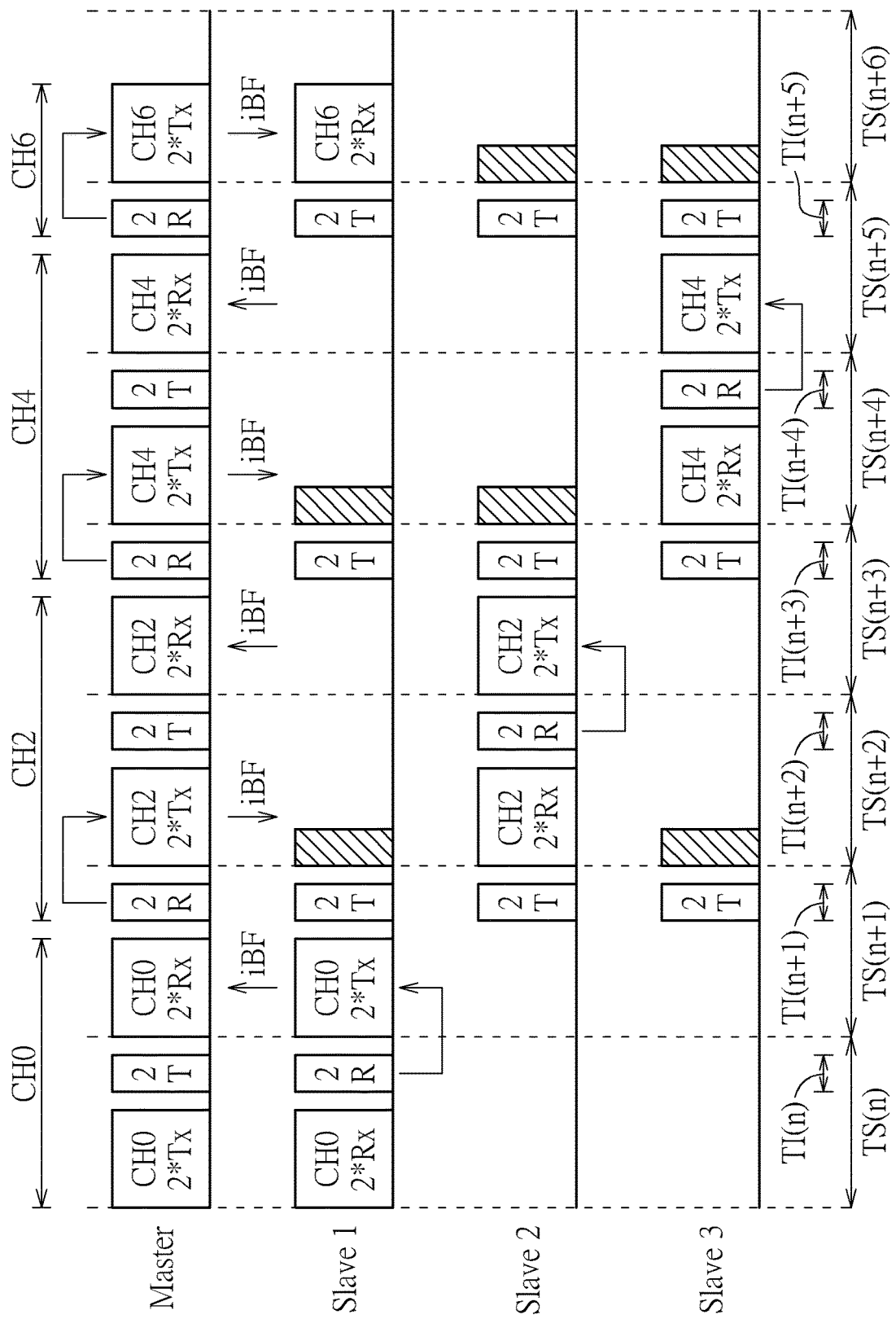
FIG. 7 is a diagram illustrating a fourth TDD scheme for packet transmission according to an embodiment of the present invention.

FIG. 7 is a diagram illustrating a fourth TDD scheme for packet transmission according to an embodiment of the present invention. Suppose that the wireless communication system 300 shown in FIG. 3 is configured to have one wireless communication apparatus 302 that acts as a BT master device (denoted by "Mater") within a piconet and three wireless communication apparatuses 304 that act as BT slave devices (denoted by "Slave 1", "Slave 2", and "Slave 3") within the piconet. In accordance with the BT specification, a master device starts transmission in even-numbered time slots, where transmission may be extended over up to 5 time slots; and a slave device starts transmission in odd-numbered time slots. In addition, hopping frequency should remain fixed for the duration of one packet. As shown in FIG. 7, there are consecutive time slots TS (n)-TS (n+6) each having a length of 625 us, where time slots TS(n), TS(n+2), TS(n+4), and TS(n+6) are even-numbered time slots, and TS(n+1), TS(n+3), and TS(n+5) are odd-numbered time slots. In this embodiment, the BT master device "Master" and the BT slave devices "Slave 1", "Slave 2", "Slave 3" operate with AFH. In addition, an operation mode of each of the BT slave devices "Slave 1", "Slave 2", "Slave 3" is an active mode. The major difference between the packet transmission shown in FIG. 5 and FIG. 7 is that a slave device operating under an active mode can't know which time slot is for it before an access code of a packet is received. Hence, all of the slave devices must transmit training signals to the master device for all odd-numbered slots.

In a margin time interval TI(n+1) within the time slot TS(n+1), all of the BT slave devices "Slave 1", "Slave 2", "Slave 3" transmits training signals at channel CH0, and the BT master device "Master" receives the training signals at channel CH0. The BT master device "Master" performs channel estimation according to received training signals that is obtained from receiving training signals generated from the BT slave device "Slave 2" when the BT master device "Master" decides to transmit a packet to the BT slave device "Slave 2".

During the time slot TS(n+2), the BT master device "Master" transmits the packet at channel CH2 by using two antennae, where beamforming coefficients (which are determined for the channel CH2) are applied to packet transmission in the time slot TS(n+2). The access code of the packet intended to be received by the BT slave device "Slave 2" includes address information of the BT slave device "Slave 2". All of the BT slave devices "Slave 1", "Slave 2", "Slave 3" receive the access code of the packet transmitted from the BT master device "Master". The BT slave device "Slave 2" refers to the access code of the packet to know that the time slot TS(n+2) is for it to receive the packet. However, both of the BT slave devices "Slave 1" and "Slave 3" are inactive after receiving the access code of the packet. Since the BT master device "Master" and the BT slave devices "Slave 1", "Slave 2", and "Slave 3" operate under AFH, the down-link channel used by the BT master device "Master" and the BT slave device "Slave 2" in the time slot TS(n+2) is the same as the up-link channel used by the BT master device "Master" and the BT slave device "Slave 2" in the time slot TS(n+3). In a margin time interval TI(n+2) within the time slot TS (n+2), the BT slave device "Slave 2" transmits training signals at channel CH2 by using two antennae, and the BT master device "Master" receives the training signals at channel CH2 by using two antennae.

Similarly, all of the BT slave devices "Slave 1", "Slave 2", "Slave 3" transmit training signals to the BT slave device "Master" in each of margin time intervals TI(n+3) and TI(n+5), and the BT slave device "Slave 3" transmits training signals to the BT slave device "Master" in the margin time interval TI(n+4). In this embodiment, training signals (which form a 2×2 training signal for channel estimation) are transmitted for each time slot. In addition, implicit beamforming is employed for packet transmission in time slots TS (n+3)-TS(n+6). In the beginning of each of the time slots TS(n+1) and TS(n+6), all of the BT slave devices "Slave 1", "Slave 2", "Slave 3" receive an access code of a packet transmitted from the BT master device "Master". Since a person skilled in the art can readily understand details of following packet transmission by analogy, further description is omitted here for brevity.

Figure 8:
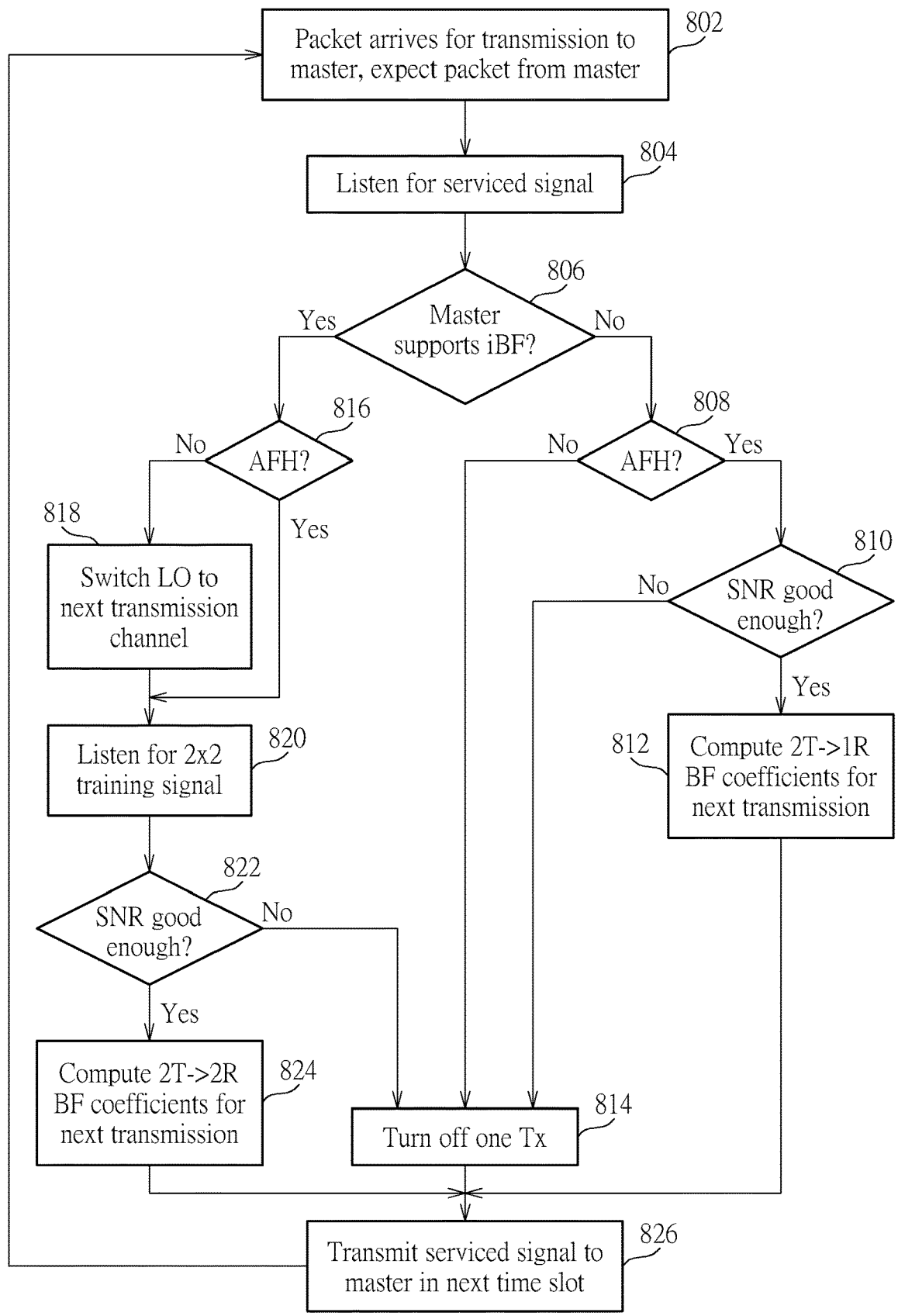
FIG. 8 is a flowchart illustrating a method of communicating with a BT master device according to an embodiment of the present invention.

FIG. 8 is a flowchart illustrating a method of communicating with a BT master device according to an embodiment of the present invention. Provided that the result is substantially the same, the steps are not required to be executed in the exact order shown in FIG. 8. The method is performed by a BT slave device. For example, the method may be employed by the wireless communication apparatus 102 that acts as a slave device. For another example, the method may be employed by one of the wireless communication apparatuses 302 and 304 that acts as a slave device.

At step 802, a packet to be transmitted to a BT master device is available in the BT slave device. At step 804, the BT slave device listens for a serviced signal that is transmitted from the BT master device. At step 806, the BT slave device refers to information given from the BT master device to determine if the BT master device supports an implicit beamforming (iBF) function. When the BT master device does not support an iBF function, the flow proceeds with step 808.

When the BT slave device operates under AFH, the BT slave device checks if the signal-to-noise ratio (SNR) is good enough (steps 808 and 810). If the SNR is good enough, the BT slave device computes BF coefficients for next transmission (step 812). If the SNR is not good enough, the BT slave device with two antennae disables the iBF function by turning off a transmit chain connected to one of the antennae (step 814). When the BT slave device does not operate under AFH, the BT slave device with two antennae disables the iBF function by turning off a transmit chain connected to one of the antennae (steps 808 and 814).

When the BT slave device determines that the BT master device supports an iBF function (step 806), the flow proceeds with step 816. When the BT slave device operates under AFH (step 816), the flow proceeds with step 820. When the BT slave device do not operate under AFH, the BT slave device controls a local oscillator (LO) for changing an LO frequency to a channel frequency of the next transmit channel (steps 816 and 818). At step 820, the BT slave device listens for a 2×2 training signal that is used for channel estimation. At step 822, the BT slave device checks if the SNR is good enough. If the SNR is good enough, the BT slave device computes BF coefficients for next transmission (step 824). If the SNR is not good enough, the BT slave device with two antennae disables the iBF function by turning off a transmit chain connected to one of the antennae (step 814).

At step 826, the BT slave device transmits a serviced signal to the BT master device in the next time slot. Next, the flow proceeds with step 802.

Since a person skilled in the art can readily understand details of the method shown in FIG. 8 after reading above paragraphs directed to the TDD schemes shown in FIGS. 2 and 5-7, further description is omitted here for brevity.

Figure 9:
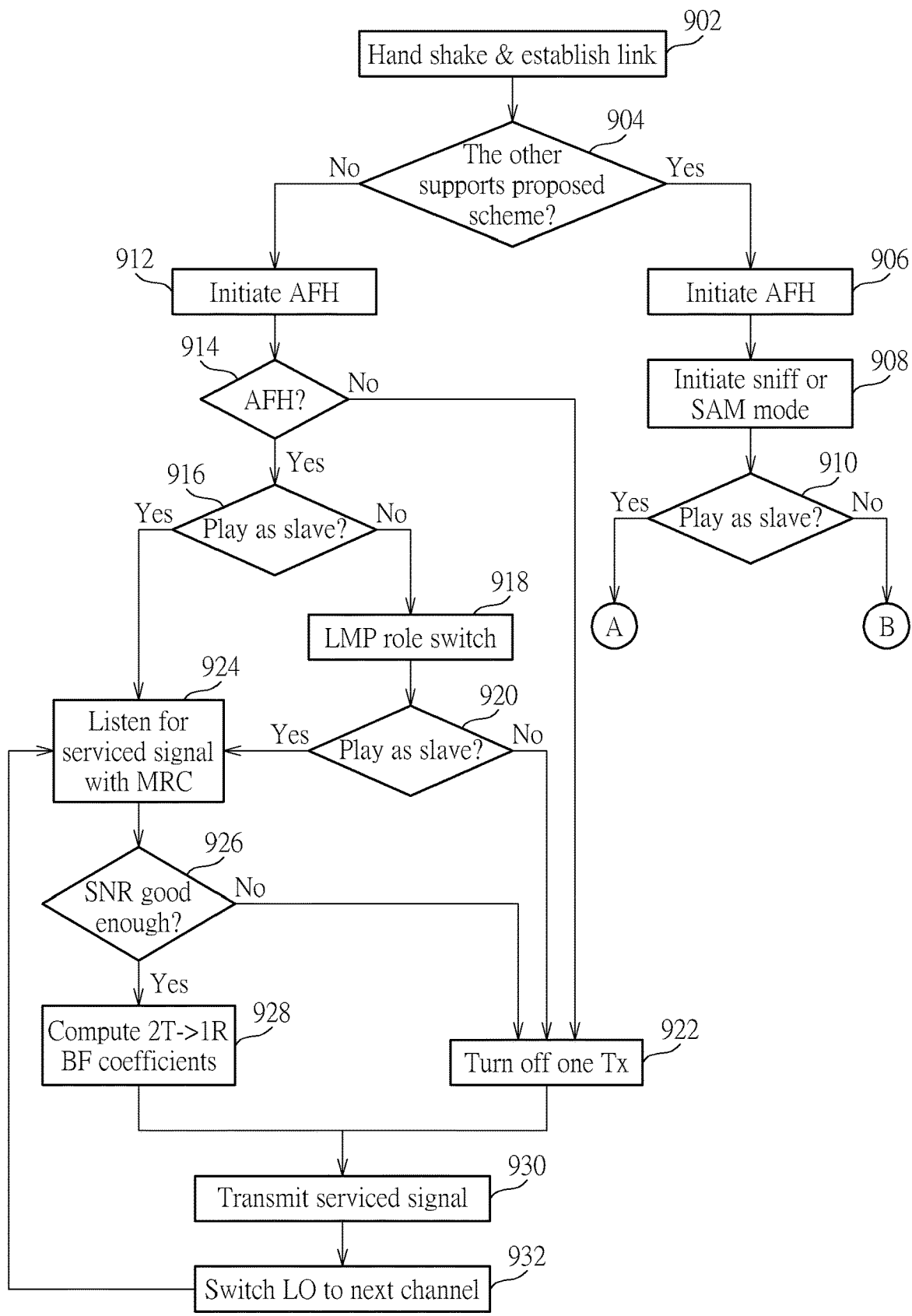
FIG. 9 is a flowchart illustrating a wireless communication method according to an embodiment of the present invention.
Figure 10:
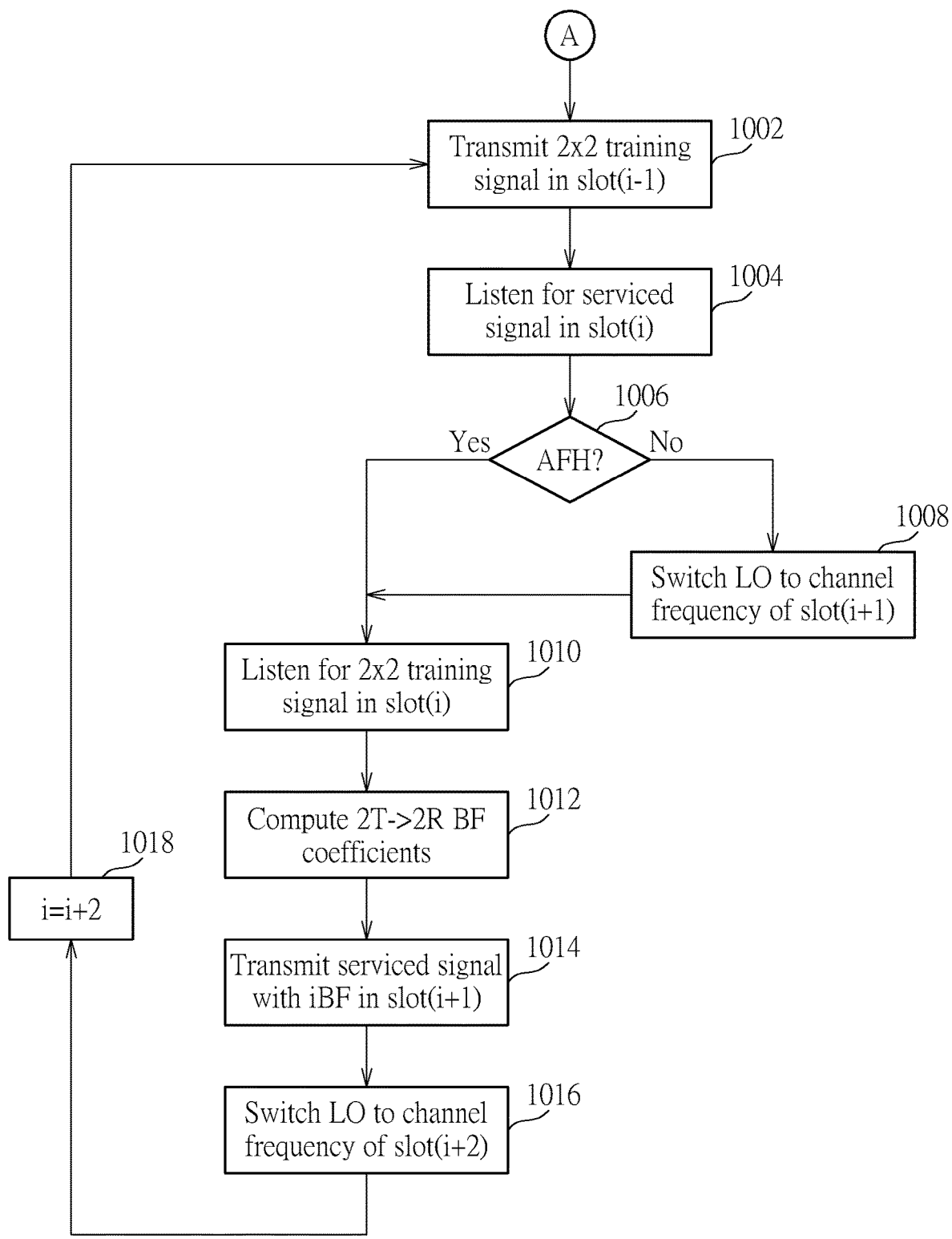
FIG. 10 is one continued flowchart of the wireless communication method shown in FIG. 9.
Figure 11:
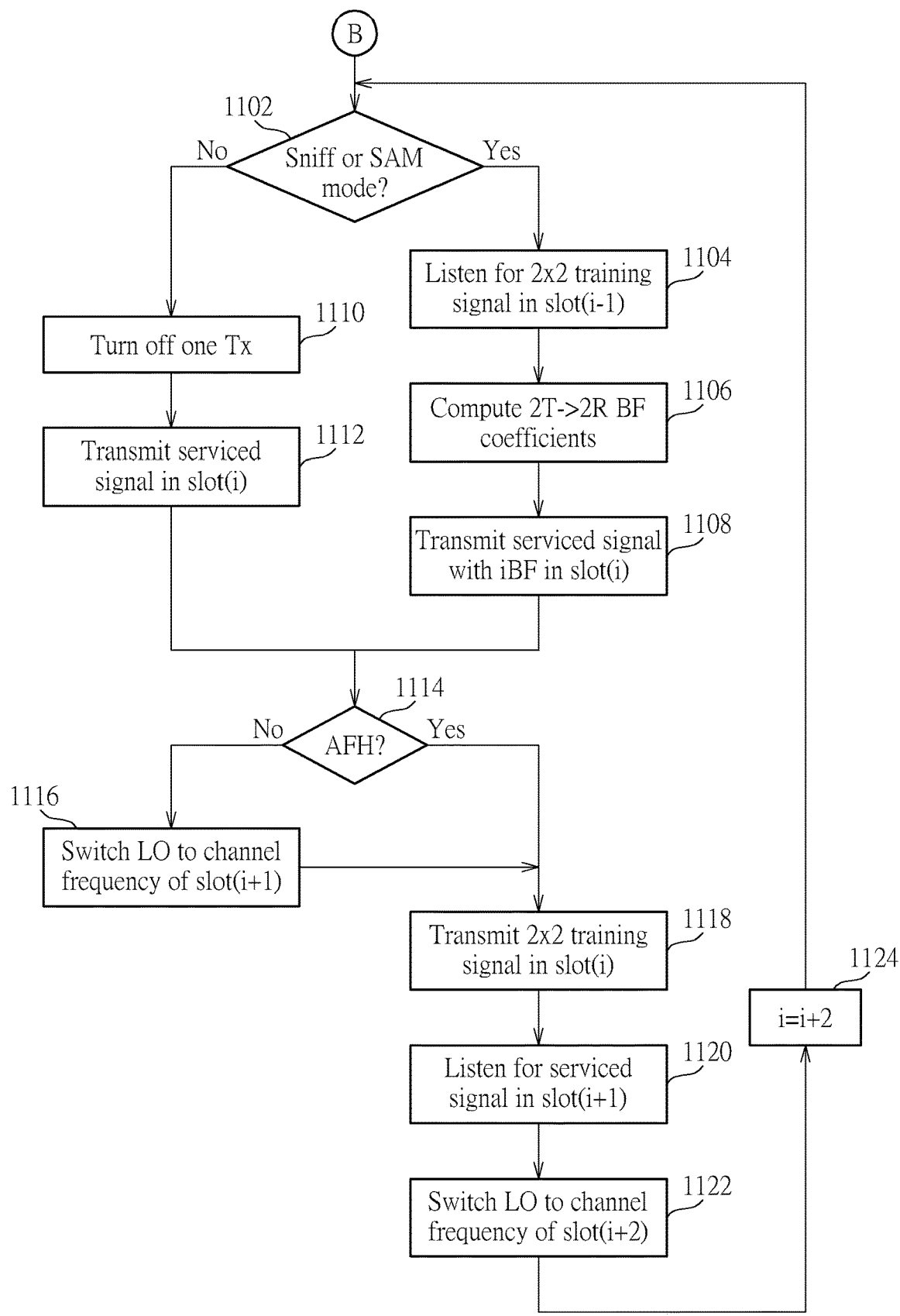
FIG. 11 is another continued flowchart of the wireless communication method in FIG. 9.

FIG. 9 is a flowchart illustrating a wireless communication method according to an embodiment of the present invention. FIG. 10 is one continued flowchart of the wireless communication method shown in FIG. 9. FIG. 11 is another continued flowchart of the wireless communication method in FIG. 9. The proposed wireless communication method is capable of performing implicit beamforming in compliance with Bluetooth specification. Provided that the result is substantially the same, the steps are not required to be executed in the exact order shown in FIGS. 9-11. The wireless communication method is employed by a wireless communication apparatus using a proposed scheme that performs implicit beamforming under frequency hopping. For example, the wireless communication method may be employed by the wireless communication apparatus 102. For another example, the wireless communication method may be employed by any of the wireless communication apparatuses 302 and 304.

At step 902, a hand shaking procedure is enabled for establishing a link between one wireless communication apparatus and the other wireless communication apparatus. At step 904, the wireless communication apparatus which supports the proposed scheme checks if the other wireless communication apparatus also supports the same proposed scheme. When the other wireless communication apparatus does not support the proposed scheme, meaning that the other wireless communication apparatus is a conventional wireless communication apparatus, the flow proceeds with step 912. At step 912, the wireless communication apparatus initiates AFH. When the wireless communication apparatus and the other wireless communication apparatus do not operate under AFH (step 914), the flow proceeds with step 922. When the wireless communication apparatus and the other wireless communication apparatus operate under AFH, the flow proceeds with step 916. When the wireless communication apparatus is a master device after initial communications are established between the wireless communication apparatus and the other wireless communication apparatus, the wireless communication apparatus sends a master-slave role switch request to the other wireless communication apparatus through an LMP mechanism (steps 916 and 918).

When the wireless communication apparatus is a master device after initial communications are established between the wireless communication apparatus and the other wireless communication apparatus and is unable to become a slave device via an LMP master-slave role switch, the flow proceeds with step 922. When the wireless communication apparatus is a slave device after initial communications are established between the wireless communication apparatus and the other wireless communication apparatus (step 916) or becomes a slave device via an LMP master-slave role switch (step 920), the flow proceeds with step 924.

At step 924, the wireless communication apparatus listens for a serviced signal with maximum-ratio combining (MRC). At step 926, the wireless communication apparatus checks if the SNR is good enough. If the SNR is good enough, the wireless communication apparatus computes BF coefficients for next transmission (step 928). If the SNR is not good enough, the flow proceeds with step 922. At step 922, the wireless communication apparatus with two antennae disables the iBF function by turning off a transmit chain connected to one of the antennae. At step 930, the wireless communication apparatus transmits a serviced signal to the other wireless communication apparatus. Next, the wireless communication apparatus controls a local oscillator (LO) for changing an LO frequency to a channel frequency of the next receive channel (step 932), and the flow proceeds with step 924.

When the other wireless communication apparatus supports the proposed scheme (step 904), meaning that the other wireless communication apparatus is not a conventional wireless communication apparatus, the flow proceeds with step 906. At step 906, the wireless communication apparatus initiates AFH. At step 908, the wireless communication apparatus initiates a sniff mode or an SAM mode.

When the wireless communication apparatus is a slave device after initial communications are established between the wireless communication apparatus and the other wireless communication apparatus, steps included in the flow shown in FIG. 10 are performed. At step 1002, the wireless communication apparatus (which acts as a BT slave device) transmits a 2×2 training signal in an odd-numbered slot slot(i−1). At step 1004, the wireless communication apparatus (which acts as a BT slave device) listens for a serviced signal in an even-numbered slot slot(i). When the wireless communication apparatus (which acts as a BT slave device) does not operate under AFH, it controls a local oscillator (LO) for changing an LO frequency to a channel frequency of an odd-numbered slot slot (i+1) (step 1008). When the wireless communication apparatus (which acts as a BT slave device) operates under AFH, the flow proceeds with step 1010. At step 1010, the wireless communication apparatus (which acts as a BT slave device) listens for a 2×2 training signal in the even-numbered slot slot(i). At step 1012, the wireless communication apparatus (which acts as a BT slave device) computes BF coefficients. At step 1014, the wireless communication apparatus (which acts as a BT slave device) transmits a serviced signal with iBF in the odd-numbered slot slot(i+1). At step 1016, the wireless communication apparatus (which acts as a BT slave device) controls a local oscillator (LO) for changing an LO frequency to a channel frequency of an even-numbered slot slot(i+2). Next, the time slot index i is updated by (i+2) at step 1018, and the flow proceeds with step 1002.

When the wireless communication apparatus is a master device after initial communications are established between the wireless communication apparatus and the other wireless communication apparatus, steps included in the flow shown in FIG. 11 are performed. When an operation mode of the wireless communication apparatus (which acts as a BT master device) is neither a sniff mode nor an SAM mode, the wireless communication apparatus (which acts as a BT master device) with two antennae disables the iBF function by turning off a transmit chain connected to one of the antennae (step 1110), and transmits a serviced signal in an even-numbered slot slot(i) (step 1112).

When an operation mode of the wireless communication apparatus (which acts as a BT master device) is one of a sniff mode and an SAM mode, the wireless communication apparatus (which acts as a BT master device) listens for a 2×2 training signal in an odd-numbered slot slot(i−1) (step 1104), computes BF coefficients (step 1106), and transmits a serviced signal with iBF in an even-number slot slot(i).

When the wireless communication apparatus (which acts as a BT master device) does not operate under AFH, it controls a local oscillator (LO) for changing an LO frequency to a channel frequency of an odd-numbered slot slot(i+1) (step 1116). When the wireless communication apparatus (which acts as a BT master device) operates under AFH, the flow proceeds with step 1118. At step 1118, the wireless communication apparatus (which acts as a BT master device) listens for a 2×2 training signal in the even-numbered slot slot(i). At step 1120, the wireless communication apparatus (which acts as a BT master device) listens for a serviced signal in the odd-numbered slot slot (i+1). At step 1122, the wireless communication apparatus (which acts as a BT master device) controls a local oscillator (LO) for changing an LO frequency to a channel frequency of an even-numbered slot slot(i+2). Next, the time slot index i is updated by (i+2) at step 1124, and the flow proceeds with step 1102.

Since a person skilled in the art can readily understand details of the method shown in FIGS. 9-11 after reading above paragraphs directed to the TDD schemes shown in FIGS. 2 and 5-7, further description is omitted here for brevity.

Briefly summarized, the proposed method performs beamforming under a normal frequency hopping sequence in compliance with a communication specification (e.g., BT specification). Hence, the proposed method does not violate the communication specification (e.g., BT specification). Since the normal frequency hopping sequence in compliance with the communication specification (e.g., BT specification) is employed, the frequency diversity is not degraded. In addition, the proposed method can be employed by one wireless communication device (e.g., BT slave device) for performing signal transmission with beamforming to transmit packets to another wireless communication device (e.g., BT master device) that is a conventional wireless communication device supporting frequency hopping but not beamforming. Furthermore, in accordance with the proposed method, the time interval between iBF estimation and compensation is short for a multi-slave environment.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication apparatus comprising:
a channel estimation circuit, arranged to estimate a channel between the wireless communication apparatus and another wireless communication apparatus during at least one first time slot;
a beamforming control circuit, arranged to determine beamforming coefficients according to the estimated channel; and
a transmit (TX) circuit, arranged to apply the beamforming coefficients to transmission of an output data during at least one second time slot later than said at least one first time slot, wherein during said at least one second time slot, the output data is transmitted to said another wireless communication apparatus via multiple antennae,
wherein the wireless communication apparatus performs communications according to a normal frequency hopping sequence in compliance with a communication specification,
wherein said another wireless communication apparatus has only a single antenna,
wherein the wireless communication apparatus is arranged to act as a slave device by sending a master-slave role switch request to said another wireless communication apparatus, and
wherein the wireless communication apparatus is arranged to perform implicit beamforming to transmit the output data to the another wireless communication apparatus while the wireless communication apparatus acts as the slave device.

2. The wireless communication apparatus of claim 1, wherein the communication specification is a Bluetooth specification, and the wireless communication apparatus operates under adaptive frequency hopping (AFH).

3. The wireless communication apparatus of claim 1, wherein the implicit beamforming is performed based on a channel estimation of a most recent down-link channel from the another wireless communication apparatus to the wireless communication apparatus.

4. A wireless communication method comprising:
configuring a first wireless communication apparatus to perform communications according to a normal frequency hopping sequence in compliance with a communication specification;
during at least one first time slot, performing channel estimation to estimate a channel between the first wireless communication apparatus and a second wireless communication apparatus;
determining beamforming coefficients according to the estimated channel; and
during at least one second time slot later than said at least one first time slot, applying the beamforming coefficients to transmission of an output data for transmitting the output data from the first wireless communication apparatus to the second wireless communication apparatus via multiple antennae,
wherein the second wireless communication apparatus has only a single antenna,
wherein the method further comprises:
sending a master-slave role switch request from the first wireless communication apparatus to the second wireless communication apparatus for the first wireless communication apparatus to act as a slave device,
wherein the first wireless communication apparatus performs implicit beamforming to transmit the output data to the second wireless communication apparatus while the first wireless communication apparatus acts as the slave device.

5. The wireless communication method of claim 4, wherein the communication specification is a Bluetooth specification, and the wireless communication method further comprises:
configuring the first wireless communication apparatus to employ adaptive frequency hopping (AFH).

6. The wireless communication method of claim 4, wherein the implicit beamforming is performed based on a channel estimation of a most recent down-link channel from the second wireless communication apparatus to the first wireless communication apparatus.

* * * * *